Aug. 17, 1965  H. K. GILLMAN  3,200,864
APPARATUS FOR STACKING AND WEIGHING SLICED FOOD PRODUCTS
Filed Dec. 19, 1962  10 Sheets-Sheet 1

INVENTOR.
HAROLD K. GILLMAN

Aug. 17, 1965    H. K. GILLMAN    3,200,864
APPARATUS FOR STACKING AND WEIGHING SLICED FOOD PRODUCTS
Filed Dec. 19, 1962    10 Sheets-Sheet 2

INVENTOR.
HAROLD K. GILLMAN

FIG. 5

INVENTOR.
HAROLD K. GILLMAN

FIG. 6

INVENTOR.
HAROLD K. GILLMAN

Aug. 17, 1965 H. K. GILLMAN 3,200,864
APPARATUS FOR STACKING AND WEIGHING SLICED FOOD PRODUCTS
Filed Dec. 19, 1962 10 Sheets-Sheet 6

INVENTOR.
HAROLD K. GILLMAN

FIG. 13

United States Patent Office 3,200,864
Patented Aug. 17, 1965

3,200,864
APPARATUS FOR STACKING AND WEIGHING
SLICED FOOD PRODUCTS
Harold K. Gillman, Albany, N.Y., assignor to Unexcelled
Chemical Corporation, Albany, N.Y., a corporation of
New York
Filed Dec. 19, 1962, Ser. No. 245,833
10 Claims. (Cl. 146—94)

The present invention relates to improvements in apparatus for slicing food products and arranging them in stack form and, more particularly, such apparatus wherein the weight of the stacks is controlled automatically within close tolerances and underweight stacks rejected so that the stacked slices are packaged in prescribed weights with giveaway maintained at a minimum.

Apparatus of this type is disclosed in commonly assigned patent application, Serial No. 93,634, filed March 6, 1961, now U.S. Patent No. 3,099,304, for Apparatus for Stacking and Weighing Sliced Food Products and Serial No. 130,982, filed August 11, 1961, for Improved Apparatus for Stacking and Weighing Sliced Food Products.

In accordance with the present invention, apparatus is provided for stacking and weighing slices of food products, specifically, in the nature of cold cuts, coming from the discharge end of a slicing machine. The apparatus is initially set to receive a certain number or count of slices which are batched in stack form and transported through a weighing station. A scale at this station serves to feedback appropriate signals to the feeding mechanism of the slicing machine to adjust slice thickness to compensate for over or underweight stacks registered by the scale. The scale also serves to actuate a reject mechanism for isolating those stacks not within the prescribed weight tolerances.

Thus, a stacker at the discharge end of the slicing machine is set to be actuated through a counter for six, eight or ten slices, for example, according to the particular stack desired. The stacker receives the selected number of slices and places the stacked product on a moving weighing belt at the weigh station. The scale at the station has been previously set for the desired weight and permissible tolerance. The weight of the group of sliced product is then automatically registered by the scale; and if more than the preset tolerance, the group will be rejected from the line. At this instant, a signal is fed back to the feed control of the slicing machine to alter the thickness of slice in the next group being formed. As long as the scale registers zero correction, the feed control will not change. If there is a variance, the control modulates to maintain a fixed given weight for each stacked group.

Therefore, any group not within the weight tolerance is rejected on a takeaway conveyor. In this connection, the first one, two or three groups on either end of the particular loaf being sliced are ordinarily automatically rejected. The feed control is usually maintained in an insensitive position at this time to prevent any correction being fed back from the scale. Along the takeaway conveyor a scaler is located to work on the rejected stacks to make the desired weight. These stacks are placed in line and directed to the packaging location. The apparatus further includes electronic circuitry including printed circuit cards for facilitating maintenance and repairs, as well as the determination of the exact nature of trouble if it should, for any reason, occur.

An object of this invention is to provide the above apparatus with an improved weigh conveyor, as well as a conveyor capable of multiple speeds, whereby a stack of sliced products is received when the conveyor is traveling at a slower rate to prevent any disarrangement, immediately weighed, and then accelerated to higher speeds in an effort to remove the weighed stack and permit another stack to be received and weighed as quickly as possible.

Another object is to provide such an apparatus with an improved servo-mechanism for controlling the rate of advance of the slicing machine feeder.

A further object is to provide such apparatus with an improved reject station for directing the stacks of sliced product not within the prescribed weight tolerances out of line so that the proper weight may be made and, at the same time, permit those stacks within the preset weight tolerances to be transferred to the packaging location.

An important object is to provide an improved apparatus of the type described having optimum reliability in operation and performance, one that is easily operated and maintained and permits savings in cost by minimizing the number of attendant personnel and giveaway.

Other objects and advantages will become apparent from the following detailed description of a somewhat preferred embodiment of the invention which is to be taken in conjunction with the accompanying drawings in which:

In the accompanying drawings, the weighing while conveying apparatus 30 and stacker 32 are shown at the discharge end of a slicing machine 34. The sliced products produced by the slicing machine are discharged on to the stacker and from thence as a batch or stack on to the weighing apparatus 36. The stack is then transferred to a packaging station 38 by a transverse conveyor 40 if of prescribed weight. If not, the stack is moved by the interposed reject conveyor 42 to a make-weight station 44 at which point the proper weight is made.

Slicing machine

The invention may utilize the several different types of slicing machines presently existing on the market. The drawings illustrate one type of slicing machine 34 to which the invention is particularly applicable. It should be understood, however, that the slicing machine does not per se constitute this invention. The illustrated slicing machine is available commercially under the name Anco, Number 832, Cold Cut Slicer, manufactured by the Allbright-Nell Co. of Chicago, Illinois. This slicing machine is fully disclosed in literature published by the manufacturer as well as commonly assigned U.S. patent application, Serial No. 93,634, filed March 6, 1961, and Serial No. 130,982, filed August 11, 1961.

Figure 5:
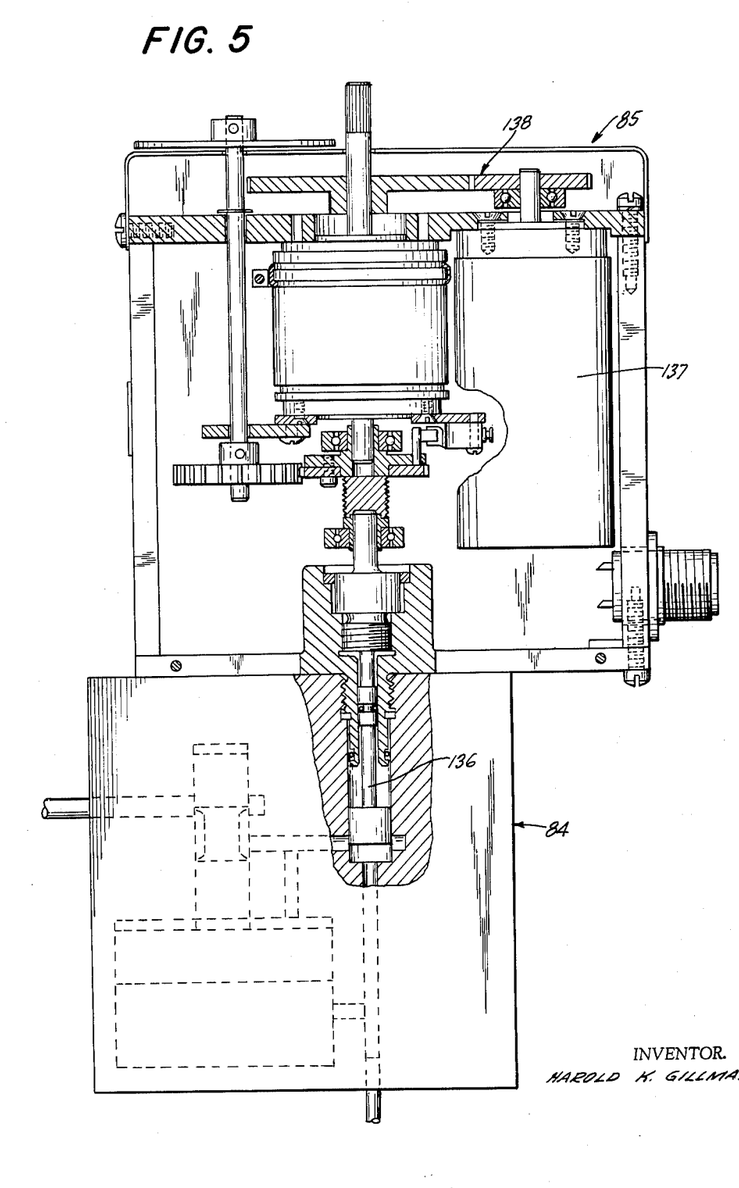
FIG. 5 is an enlarged elevational view of the servo-mechanism shown associated with the flow control for the slicing machine feeder with certain parts broken away and removed and others sectioned.

Suffice it to say, the speed at which the feeder 45 shifts in a forward or feeding direction is controlled by the flow control valve 84 which, in turn, is adapted to be modified to correspondingly alter the hydraulic fluid flow pattern by the manual flow control which forms part of the basic hydraulic circuitry. Through a suitable electronic control to be described in the following, the size of the pressure balanced orifice opening in the control valve 84 can be increased or decreased so as to increase or decrease, respectively, the flow of hydraulic fluid. By enlarging this orifice opening, it will be appreciated that the speed of the feed is increased. By decreasing the size of the opening, the speed of the feed is decreased. An operative interconnection is provided between the weighing station 36 and the control valve 84 through the servo-mechanism 85 coupled with this valve to regulate the size of this pressure balanced orifice opening so that the speed of feed of the feeder 45 can be adjusted to correspondingly change the slice thickness and thereby maintain the weight of the stacked slices within the prescribed limits. Changes in the size are brought about to insure that batch weights remain substantially constant.

Stacker

The drawings illustrate one form of particularly suitable stacker 32 which is driven in timed relationship by the knife shaft 60 of the slicer 34, and receives slices of the product 54, collects them in a stack, and after the blade has cut the last slice, deposits the stack on the conveyor of the weigh while conveying apparatus 36. The illustrated stacker does not per se constitute the present invention and is available commercially under the name Anco 834 Slice-Stacker, manufactured by the Allbright-Nell Company, Chicago, Illinois, and is disclosed in the above patent application Serial No. 130,982, as well as the references incorporated therein. Of importance is the fact that the slicer hydraulic feeding mechanism and the forward movement of the product 54 are not interrupted thereby positively maintaining uniform slice thickness and, consequently, attaining optimum weight control as well as high speed stack production.

A measuring means, in the form of a counter 108, co-operates in determining the number of slices to be deposited by the stacker paddles. The counter, essentially a selective gear transmission, is actuated in timed relationship with respect to the rotation of the slicer blade shaft 60 and, in turn, applies its output through a flexible drive shaft to the stacker 32. In this manner, the operation of the paddles is regulated as is fully disclosed in the above citations.

Weigh conveyor

Figures 3, 4:
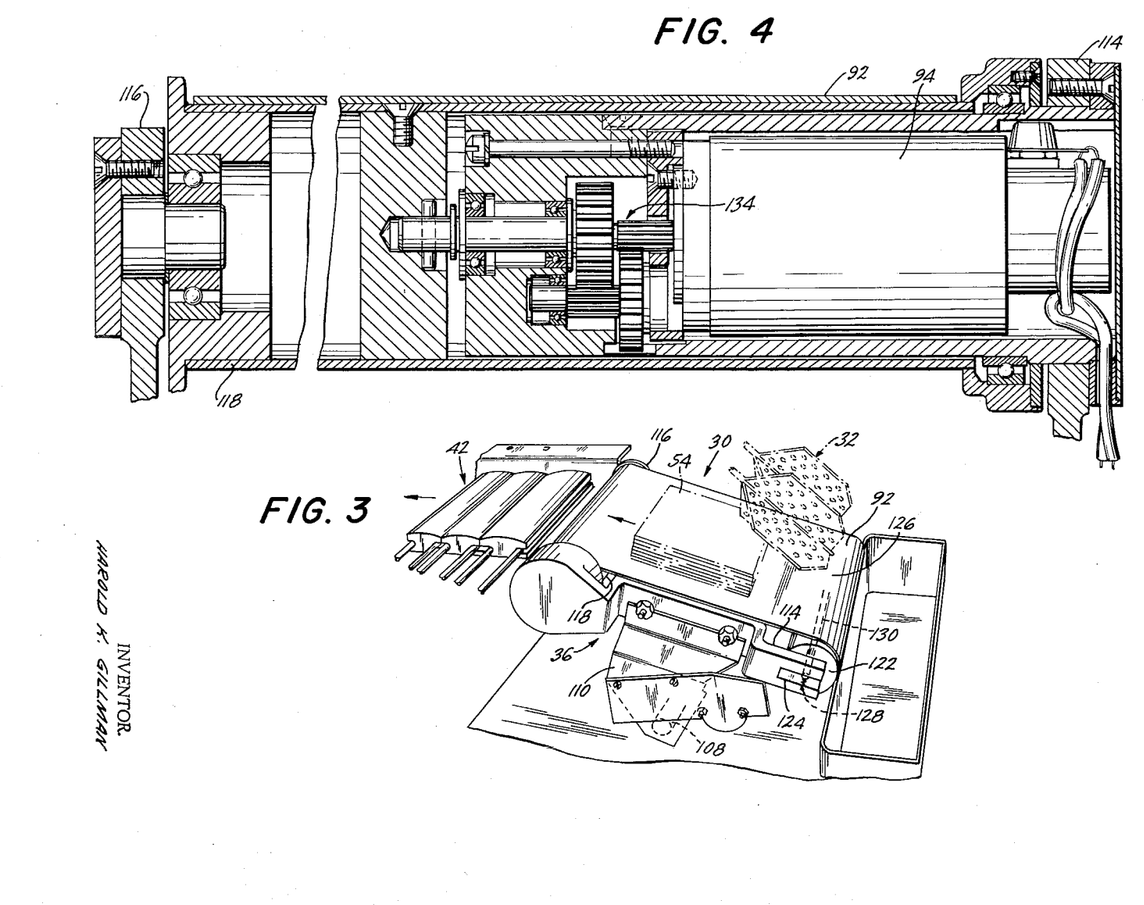
FIG. 3 is a perspective view of the weigh conveyor with certain parts removed and broken away.
FIG. 4 is an enlarged sectional view of the motor drive of the drive roll of the weigh conveyor.

The slices of the product 54 are stacked on the receiving vanes of the stacker paddles until the preselected number of slices have been deposited thereon at which time the paddles are actuated to transfer the stacked sliced product onto the weighing apparatus 36. The scale conveyor 92 of this assembly is constantly driven by motor 94 which, through operation of circuitry to be described, is adapted to induce a low speed of travel of the conveyor 92 during the depositing of the sliced stack thereon by the stacker 32 and increase the speed in order to remove the weighed stack therefrom in minimum time.

The conveyor 92 is conveniently mounted so as to actuate a scale 98 following the reception of the stack of sliced product to be weighed. The weighed stack is then transferred onto the reject conveyor 42 at which point those stacks within the prescribed weight tolerance will be permitted to pass freely to the packaging conveyor 40. Those stacks, not of proper weight, will be pushed or shifted aside by means of the reject conveyor in accordance with signals transmitted by the scale 98. The stacks of proper weight, as described, are then taken to the packaging station 38 while the stacks of improper weight are corrected and eventually similarly directed. The scale 98 will additionally generate a pulse when registering those stacks outside of the prescribed limit. This pulse will be transmitted to the servo-mechanism 85 which effectively controls the size of the orifice opening of valve 84 to correct whatever error may be present in the stack weight. As will be described, the correction made will be a certain percentage of the total error to assure overcorrection in the event of periodic sudden changes in loaf density due to voids and the like.

Figure 1:
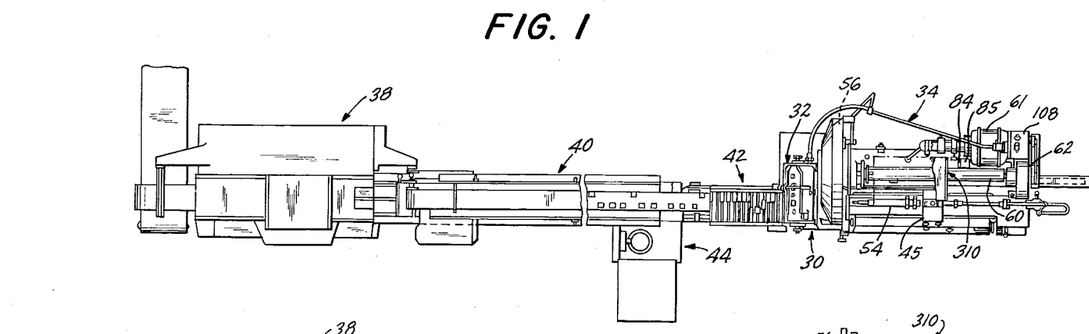
FIG. 1 is a top plan view, partially schematic, of a cold cut line in accordance with the teachings of the present invention having apparatus for stacking and weighing while conveying the sliced food products coming from a slicing machine and transferring the stacked groups, of a desired weight, to the particular packaging station and rejecting those not within preset tolerance.
Figure 2:
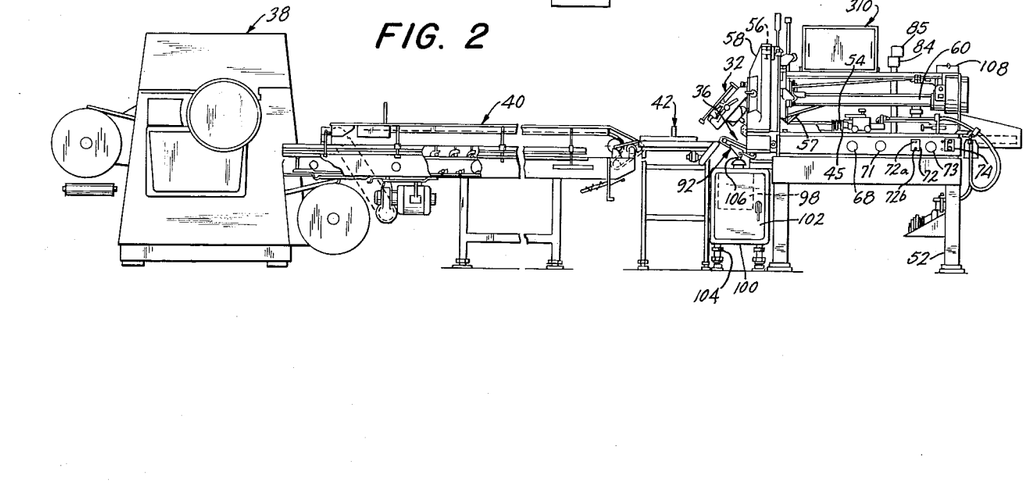
FIG. 2 is a side elevational view of this cold cut line with certain parts removed and broken away for purposes of clarity of illustration.

The weigh conveyor assembly 30 is mounted on a scale cabinet 100 having a hinged door 102 and legs 104. A tubular support 106 couples the weigh conveyor assembly 92 to the scale 98. Under such circumstances, the stack weight on the conveyor 92 will be transferred through the tubular support 106 to the scale 98 in a manner similar to that disclosed in the above U.S. patent application Serial No. 130,982. As indicated in that application and which is equally applicable here, the scale 98 does not per se constitute part of the present invention; and any one of the commercially available scales may serve the intended purpose. A scale, particularly applicable to the present invention, may be obtained commercially from the manufacturer, Wright Machinery Co., Division of Sperry Rand Corporation of Durham, North Carolina, under the name Wrightronic Checkweigher.

Referring now once again to the weigh conveyor 92, the tubular support 106 has secured it to a transverse rod 108, which, in turn, mounts a pair of brackets. One of these brackets is denoted by numeral 110 on FIG. 3. The other bracket, on the opposed side of weigh conveyor 92 is hidden thereby. These brackets, respectively, support spaced arms 114 and 116. A drive roller 118 and driven roller 122 are journaled at opposite ends of these arms. The roller 122 is adapted to be longitudinally slidable in slots 124. An endless conveyor belt 126 passes around the rolls 118 and 122 with the slack being taken up by the spring biasing means 128 located on each arm 114 and 116 and acting on the shaft 130 of the roller 122. In order to prevent sagging, fluctuations and vibration of the belt as the stack is deposited by the stacker paddles, a plate (not shown) may extend between the arms 114 and 116.

As will be observed, multiple speed motor 94 is co-axially mounted with respect to the drive roller 118 thereby simplifying the interconnection between the parts and, at the same time, reducing and minimizing the creation of undesirable torques and stresses incident to eccentric mountings. Similarly, this construction and arrangement helps to eliminate any vibration incident to the operation of the weigh conveyor 92 that may supply an error to the weight registered by the scale 98. In this manner, the extent of any imbalance due to the mounting and placement of the motor in the weigh conveyor assembly 92 is held at a minimum.

The motor 94 is conveniently mounted by the arm 114 with its output coupled with the gear train 134. In this fashion, the motor output is transmitted to the roll 118.

Feed control and servo-mechanism

As mentioned previously, the size of the orifice of the control valve 84 determines the forward speed of the feeder 45 and the size control by the servo-mechanism 85. In turn, this mechanism is controlled by signals received from the scale 98 so that the weights of the stacks of slices are regulated. In practice, permissible limits are employed around the prescribed or nominal weight of a batch or stack before a correction is made. Preferably, underweights are not tolerated whereas overweights should not exceed, for example, a quarter ounce tolerance above the nominal weight per stack. The flow control valve 84 may essentially take the form of that disclosed in the above application Serial No. 130,982 and, for that matter, may be obtained commercially under the name Vickers Pressure Compensated Flow Control Valve. Suffice it to say, the valve 84 includes a longitudinally displaceable spindle 136 which thus serves to determine the size of the valves pressure balanced orifice opening.

Referring now to the servo-mechanism 85, a reversible motor 137 is suitably bracketed within a housing and coupled with the spindle 136 of the flow control valve 84 through a suitable reduction gear train 138. This coupling enables the spindle to move longitudinally in a direction depending upon the direction of actuation of the motor. In one direction, the motor output will shift the spindle 136 inwardly, thereby reducing the orifice opening. The opening is enlarged by the reverse movement of the motor.

Reject conveyor

Figure 6:
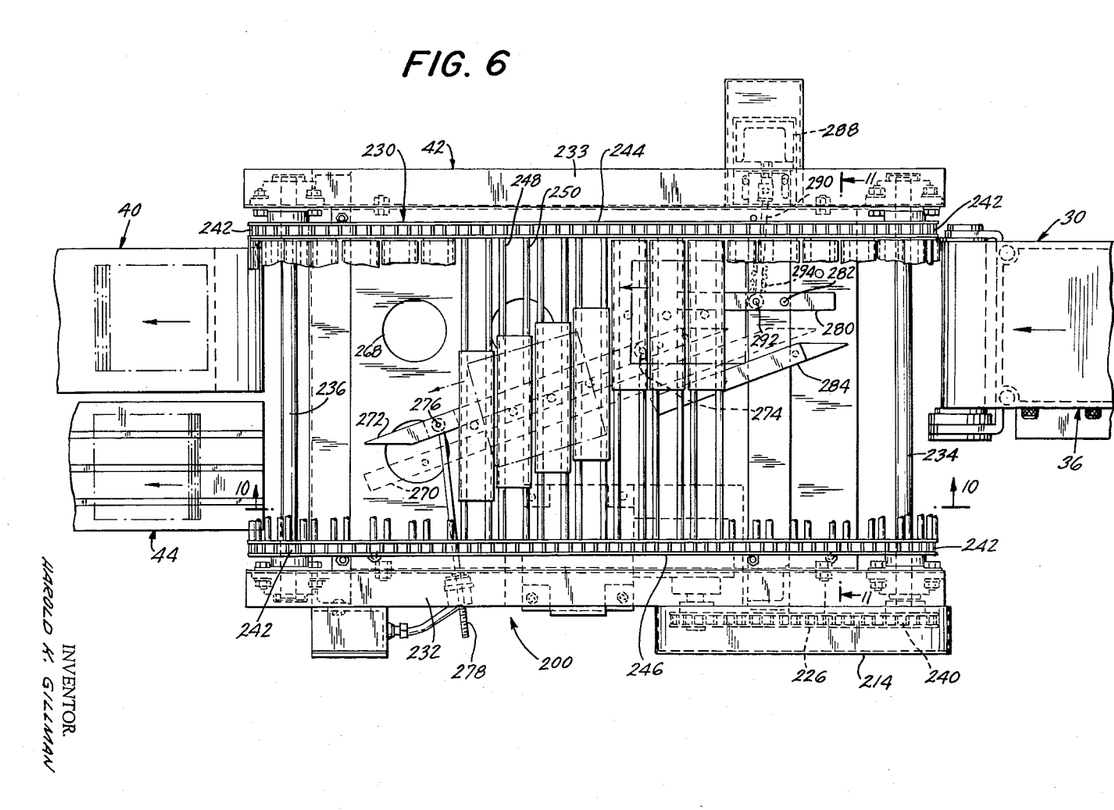
FIG. 6 is an enlarged fragmentary top plan view of the reject conveyor.
Figure 7:
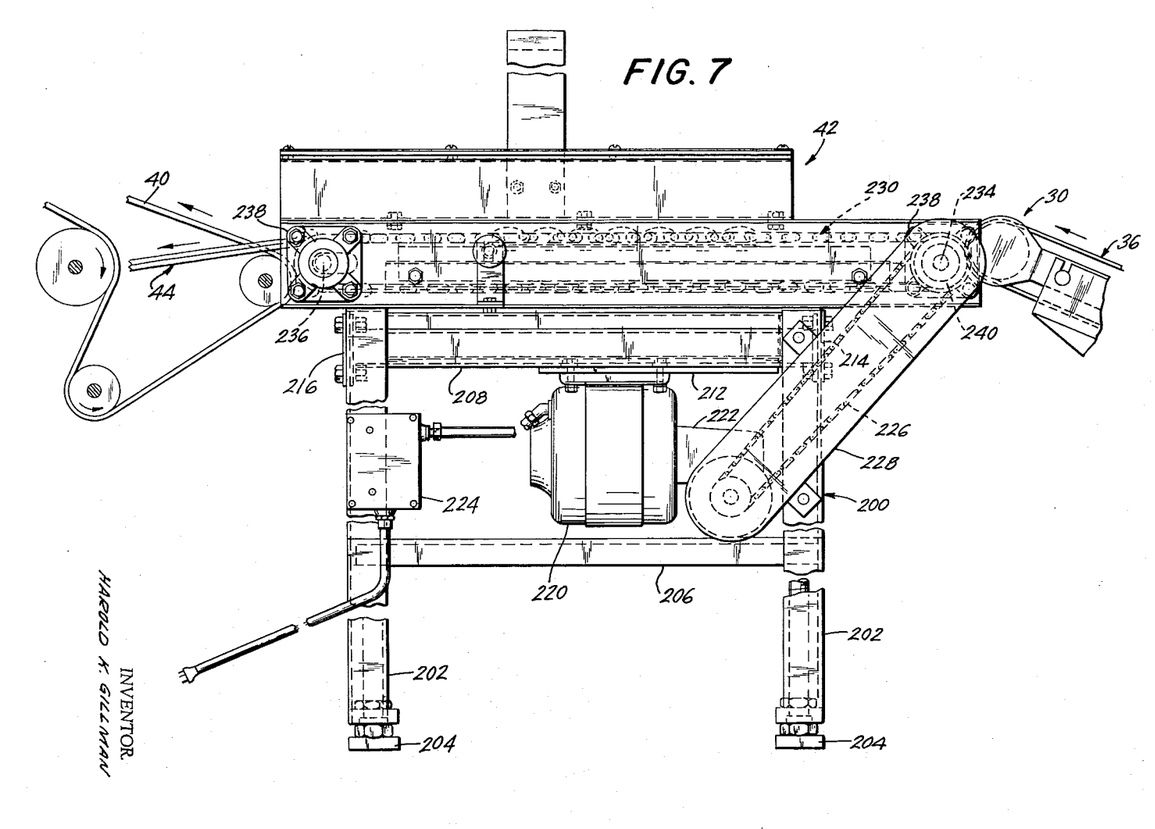
FIG. 7 is a side elevational view thereof.
Figure 8:
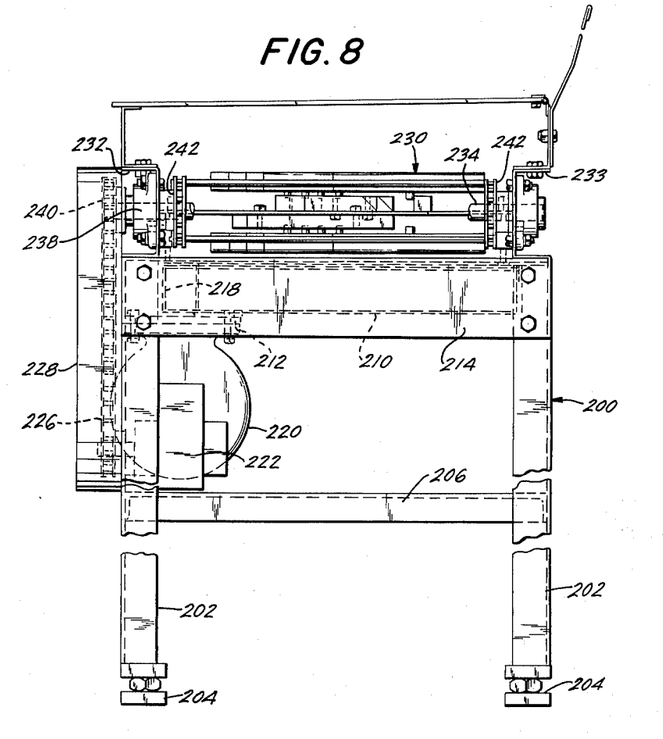
FIG. 8 is an end elevational view thereof.

The reject conveyor 42 transfers the stacks of sliced product delivered thereto by the weigh conveyor 92 to the transfer conveyor 40. Those stacks not within the prescribed limits are shifted aside or out of line so that they are readily discernable on this conveyor allowing the operator to detect them and correct their weights. The reject mechanism is mounted by means of the table 200 including legs 202, in the form of conventional angle irons, each having adjustable feet 204 for leveling this mechanism. The legs are properly spaced and secured by cross braces 206. The upper ends of the legs are also braced by means of side angles 208 which also serve to conveniently mount a scrap tray 210 and a motor mounting plate 212. The legs at the leading end are braced by the angle 214 whereas the legs at the distal end are braced by the angle 216 which is formed with an opening 218 for permitting the insertion and withdrawal of the scrap tray 210. A motor 220 is suitably bolted to the underside of the plate 212 and has its output coupled with a gear reducer 222. A terminal overload On-Off switch 224 connects the motor to a suitable source of electrical energy. The output of the gear reducer 222 is transmitted to a chain drive 226 which is covered by a chain guard 228, substantially as shown. The output of the chain drive 226 is then transmitted to the reject conveyor 230 mounted by the legs 202 as will be described.

Thus, a pair of spaced channels 232 and 233 anchored to the table 200 support the conveyor drive shaft 234 and driven shaft 236 through bearings 238 which suitably journal the ends of these shafts. A sprocket wheel 240 at the end of the shaft 234 receives the chain 226 and thereby completes the drive coupling between the conveyor 230 and motor 220. Each of the shafts 234 and 236 have keyed thereto a pair of spaced sprocket wheels 242 with the aligned wheel of each pair engaging the chain 244 in one case and 246 in the other. A series of accompanying pair of rods 248 and 250 extend between these chains 244 and 246 and are spaced closer to one another than to the adjacent pairs of rods. Each of these pair of rods serve to slidably support a flight or plaque 252.

Figure 9:
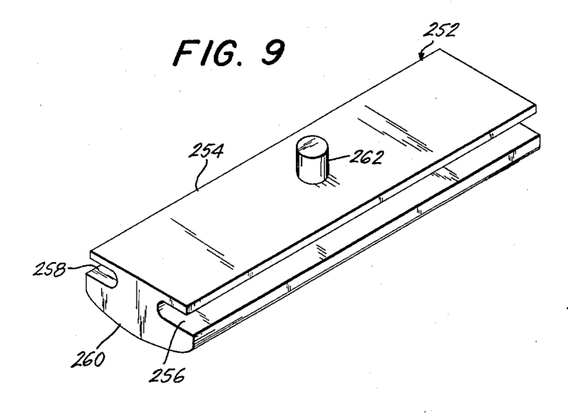
FIG. 9 is a perspective view of one of the series of flights of the reject conveyor shown on an enlarged scale.

A plaque includes a main body 254 having formed along both of its sides a slot 256 and 258 for reception of the associated rods 248 and 250, respectively. The upper face of the body is arcuate or curved to lessen the degree of friction between each plaque and the stacks traveling thereon and also minimize the tendency of the stacks to follow the plaque at the trailing end of the conveyor as they turn downwardly. A post or stud 262 extends downwardly from the substantially flat base of the plaque body and serves in effect as a cam follower in a manner to be described shortly. Thus, as will be appreciated, when the motor 220 is turned on, the conveyor 230 will be actuated causing movement of the chains 242, interposed rods 248 and 252 and, consequently, each of the plaques 250.

Figure 10:
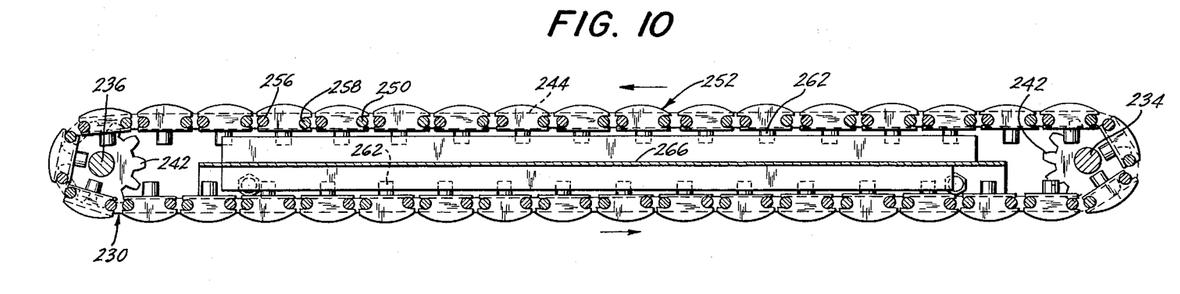
FIG. 10 is a fragmentary sectional view taken along line 10—10 of FIG. 6.
Figure 11:
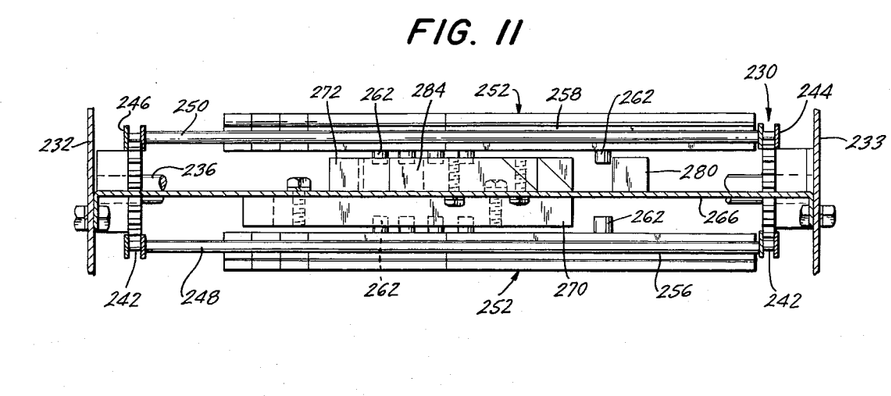
FIG. 11 is an enlarged fragmentary sectional view taken along line 11—11 of FIG. 6.

The conveyor 230 includes accompanying means for directing the plaques 252 to a proper stack receiving position at which the stacks coming from the weigh conveyor 36 are received. Thereafter, the plaques transport the stacks of permissible weight to the packaging conveyor 40 or, on the other hand, when a stack is not within the prescribed tolerance, to the make weight station 44. With this in mind, a plate 266 is interposed between the channels 232 and 233. It should be pointed out at this time that this plate is provided with a sufficient number of openings 268 to permit a large portion of any scraps from building up to a substantial amount within the conveyor by permitting them to drop into the scrap tray 210. The lower face of the plate 266 supports a return cam 270 which serves to direct any of the plaques 252 displaced to a reject position to a stack receiving position at the leading end of the reject conveyor 230. In this connection, the studs 262 of the displaced plaques will engage the cam 270 as they return from the trailing end of the conveyor to the leading end and thus direct the plaques to the stack receiving position by the time they reach the leading end of the conveyor.

The upper face of the plate includes an adjustable cam 272 supported thereon by a fixed pivot 274 and an adjustable pivot 276, adjustable by means of proper manipulation of the threaded nut and bolt assembly 278. As will become apparent shortly, this cam 272 serves to receive those plaques 252 bearing a stack of sliced product not within the prescribed weight tolerances and direct them to the reject station 44. The plaques are shifted so that they cam against the cam 272 through the operation of the movable cam 280 which is mounted on the upper face of the plate 266 by means of a fixed pivot pin 282. This movable cam 280 is adapted to be substantially aligned with the adjustable cam 272 to direct those plaques 252 bearing a stack of improper weight as indicated. However, when pivoted to its full line position as depicted in FIG. 6, the plaques are not shifted but are permitted free access through the space between the movable cam 280 and adjustable cam 272. The carried stacks will, accordingly, be directed to the packaging transfer conveyor 40.

Retaining bar 284 is also mounted on the upper face of the plate 266 and serves to prevent overshifting of the plaques 252 by the movable cam 280.

The movable cam 280 is maintained in its open position at which the plaques are permitted to travel in the direction of the transfer conveyor 40 through the continued energization of the solenoid 288; whereupon solenoid core secured to rod 290 serves to pull the movable cam 280 to the open position. In this connection, the rod 290 is pivotally connected at 292 to the movable cam 280. When the solenoid is de-energized upon receiving a pulse from the scale 98 incident to the registration of the weight outside the prescribed limit, a concentric spring 294 surrounding the rod 290 exerts a bias against the cam 280 forcing it into alignment with the adjustable cam 272. The delay between the registration of the stack weight by the scale 98 and de-energization of the solenoid 288 is such, as will be described shortly, that the cam will displace a sufficient number of the plaques 252 to assure that the stack of slices to be rejected from the line is positively displaced.

The effective speed of the reject conveyor 230 should be adjusted so that the stacks are transported more rapidly than they are on the conveyor 92. This permits the registered stacks to be removed from the scale 288 immediately. Thus, when the scale 92 registers stack weights within the prescribed limits, the solenoid 288 will cause the retraction of the cam 280. The stacks of proper weight will, accordingly, be permitted free passage to the packaging transfer conveyor 40 and ultimately to the packaging station 38. However, when an under or overweight stack is registered by the scale 98, the solenoid 288 will not be energized thereby permitting the release of the cam 280 under the influence of bias of the spring 294 causing the engaged plaques carrying the improper stack to be directed to the station 44 at which a check weigh operator can readily detect the particular stack from the remainder and then correct the weight by hand.

*Packaging conveyor and station*

With respect to the packaging conveyor and station, reference is now made to the relevant parts of the disclosure of the above application SN 130,982. As stated there, the packaging station may assume any one of a number of forms employing different wrapping or packaging techniques. In the illustrated embodiment, the wrapping station 38 includes a standard wrapping machine which functions to encase the stacks of sliced product of prescribed weight within a casing material. The transfer conveyor 40, as disclosed in the above referenced patent application, forms a standard part of this wrapping machine and is in the nature of a pouch or pocket conveyor. Suffice it to say, that for a more detailed disclosure of the transfer and packaging conveyor 40 and packaging station 38, reference should be made to this application. The wrapped stacks emerging from the outlet end of the wrapping machine are transferred to a further packaging area at which the stacks are suitably boxed or contained.

*Electronic control*

Figure 12:
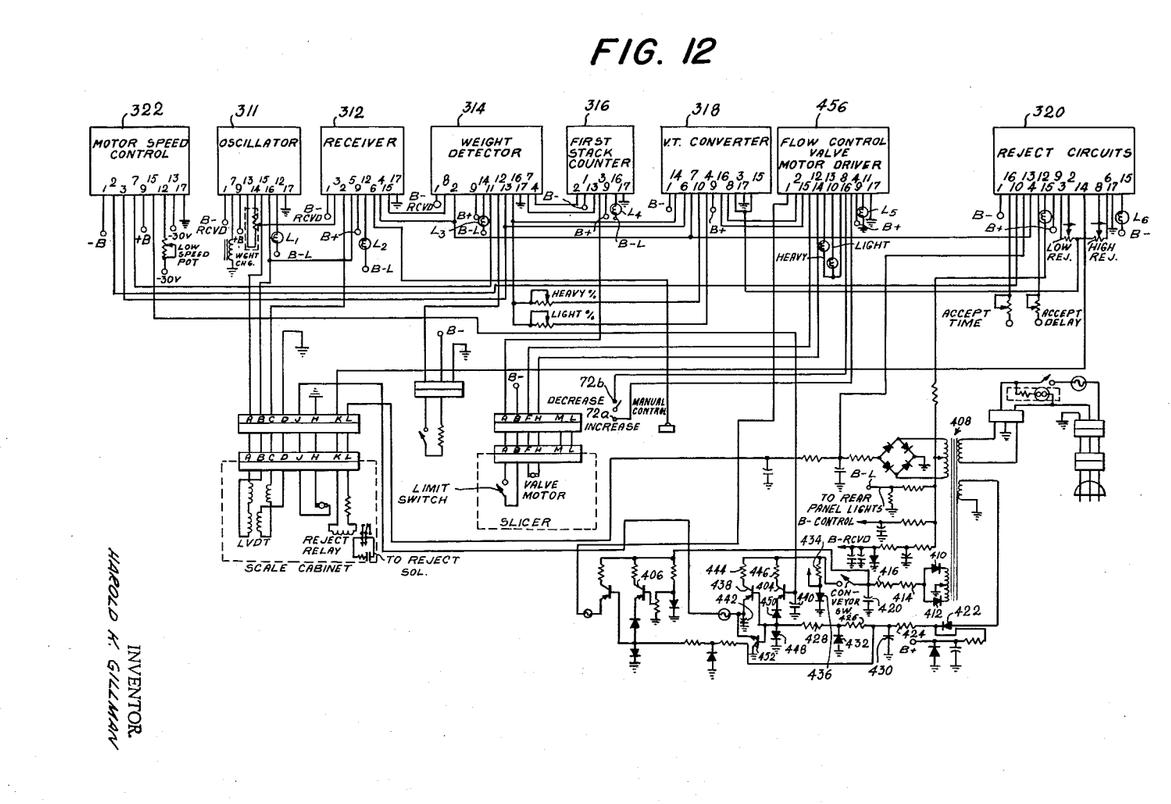
FIG. 12 is a wiring diagram of the electronic circuitry of the apparatus.

The major part of the electronic controls of the apparatus is housed in a single cabinet or box 310 secured to the frame of the slicing machine 34. The less delicate electronic components, such as the condensers and those constituting the power supply, are permanently mounted therein whereas the more delicate components are sub-divided into printed card circuitry permitting a particular card to be removed and replaced by another without complicated circuit analysis when trouble arises. For a complete understanding of the electronics contemplated by the present invention and for a better understanding of the modifications in such circuitry as proposed by this invention, reference should be made to the above application SN 130,982. It will suffice to say at this time that when a stack of sliced cold cuts is deposited on the scale conveyor 92 and while the stack is on the scale 98, it is weighed and an error signal derived assuming that the registered weight is not of the prescribed magnitude. The error signal causes the application of a correction in the feed rate of the loaf 54 into the slicer blade 56 in such a direction and of such magnitude as to bring the weight of the succeeding stacks to the proper value.

The weight is measured by sensing the scale position. This signal is suitably amplified and rectified with the gain being such that a three volt output signal is derived with the one ounce change in weight in a successful application of the invention. Since the stack of slices does not remain on the scale 98 indefinitely and since there are forces on the scale due to the impact of the stack landing on it, the scale should not read or register continuously. Therefore, the output voltage should be sampled at the proper time. The most desirable time reference is the impact of the meat on the scale 92. A suitable time delay is incorporated to the circuitry for purposes of triggering a read circuit at the best time for reading the scale 98 which ordinarily would be after the settling of the scale following impact but before the stack has started to leave the scale. Suitable inhibit circuitry serves to prevent reading of the scale when the stack on the scale is one of the first one, two or three stacks of the loaf being sliced as the case may be, the stack is much too light or a false load is applied to the scale conveyor 92, as for example, by an inadvertent bump or agitation thereof, or the stack is unduly heavy for one reason or another. In addition, the stacks produced incident to the terminal end of the loaf are taken into consideration and suitable circuitry prevents the reading of the scale under such circumstances.

If none of the inhibit signals are present at the end of the time delay following impact of the stack, the output voltage is applied to a voltage to time converter circuit. This voltage is compared with a referenced voltage indicating the "null" or, in other words, the scale position at the desired weight of stack. Depending upon the direction of the error, the converter circuitry will actuate the servo mechanism 85 in one direction or the other to correspondingly adjust the size of orifice opening of the control valve 84. The output of the converter circuitry is of a time duration proportional to the magnitude of the voltage signal applied thereto. This pulse width determines the extent of time usually in milliseconds that the servo mechanism operates to effect the change in orifice opening of the control valve 84. It has been found that, due to product irregularity, the extent of correction induced by the servo mechanism 85 should be a percentage of the actual error.

When the above mentioned time delay has ended regardless of whether the scale output voltage pulse is inhibited, the scale output is, nevertheless, sampled by reject circuitry. This circuitry senses the amplified and rectified scale output level and hence the weight of the stack on the scale 98. The reject circuitry is set to respond at both high and low reject limits corresponding to the selected weight tolerances. If the scale output falls between the levels at which the reject circuitry are set to respond, an accept delay circuit is triggered which, after the end of a predetermined period of time, enables the solenoid 288 to be energized thereby permitting the particular stack of slices to pass freely to the transfer conveyor 40. If the weight does not fall within the limits set but is either too high or too low, the solenoid 288 is not actuated and the stack in question is displaced from the line and transferred to the makeweight station 44.

*Oscillator Card*

This oscillator circuit card 311 provides the selected voltage frequency as a sinusoidal signal to the differential transformer of the scale 98. The card and operation of the circuit is essentially similar to the oscillator card and circuit disclosed in the above patent application, Serial Number 130,982.

*Receiver phase detector card*

This card 312 consists of A.C. amplifier, rectifier, filter, lamp amplifier and a phase detector. The purpose of such circuitry is to amplify the signals from the scale transformer, then convert this amplified A.C. voltage to D.C. by means of a rectifier filter, and then to provide an output signal when the scale transformer secondary voltage is sensed and compared, and finally to provide a signal to light a lamp when the phase detection is operative and a voltage phase reversal occurs incident to the depression of the scale 98 below its normal index point. This card and the mounted circuitry is taught in the above patent application, Serial Number 130,982.

*Weight detector, timing and servo inhibit card*

This card 314 contains a voltage or weight detector, a read delay circuit, a read timer circuit, an inhibit circuit and a lamp amplifier. The weight detector circuit responds to a preset voltage or weight equivalent to a weight value set at about one ounce lighter than nominal weight and then produces a signal to trigger the read delay circuit. The read delay time is selected to permit the scale to settle thereby assuring more accurate weight readings. When the delay is ended, a read pulse generator will be triggered assuming the absence of any inhibit signals. The card and contained circuitry is substantially the same as that disclosed in the above patent application, Serial Number 130,982.

First stack counter

This card 316 contains a binary counter with amplifiers for counting the stacks as they are deposited on the scale and, at the same time, provide an inhibit signal. The counter is ordinarily set at a count of up to two or three and, when such count is being made, the inhibiting function prevents corrections of weight by changing slice thickness if any weight errors occur. The card and circuitry of the first stack counter is essentially that described in the above application, Serial Number 130,982.

Voltage to time converter card

This card converts the error signal, which corresponds to the weight error, from the receiver card to a proportionally timed pulse of fixed amplitude. This card and circuitry is essentially the same as that disclosed in the above referenced patent application, Serial Number 130,982, and an application filed November 27, 1962, entitled Voltage to Time Converter Circuitry.

Reject circuitry card

This card 320 contains circuits adapted to detect the output level of the scale amplifier rectifier signal and determine whether this output is within proper limits. If within these limits, a signal is generated which actuates the accept solenoid 288 and the stack of slices whose weight has been registered is thus permitted free passage. If the output is outside of the prescribed limits, this solenoid is not energized and the particular stack is displaced on the reject conveyor 230. Under these circumstances, the card contains a special voltage detector circuit, an inhibitor, an accept delay circuit, an accept time circuit and a power amplifier circuit. This card is simply used to determine if a stack of meat should be passed or rejected. Timing circuits are also included to synchronize the reject conveyor operation to the travel of the stacks of slices.

The essential components constituting this card are found in the corresponding card disclosed in the above patent application, Serial Number 130,982. However, the control of the inhibitor circuit has been rendered more positive by deriving signals directly from card 322 to be described in detail shortly. The inhibitor circuit provides for the reading of the scale output at the proper time and controls when and how long a weight sample is to be taken. When the inhibitor circuit is actuated, all signals are shunted to ground and no weight sample can be taken. However, when the voltage applied to the inhibitor circuit goes to ground for a controlled period of time, the weight sample is taken.

Motor speed control card

Figure 13:
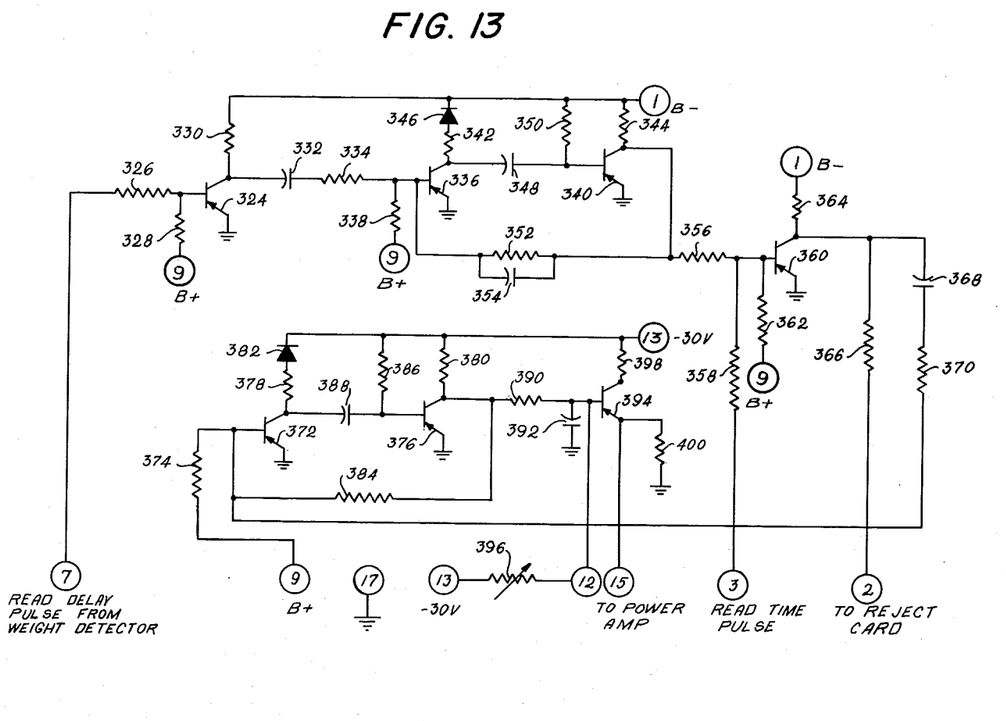
FIG. 13 is the printed circuit for the multiple speed weigh conveyor.

This card 322 controls the speed of the motor 94 to provide two speed operation of the scale 92 and also to control the weight sampling time for the reject card 320.

The read delay pulse coming from card 314 is applied to pin 7 whereby this negative going pulse turns on the normally off transistor 324. Resistor 326 is a current limiting resistor whereas resistor 328 is used to antibias transistor 324. Resistor 330 serves as the collector load. When the transistor 324 is turned on, the normally negative collector is clamped to ground causing a positive going transition. This positive signal is coupled through coupling capacitor 332 and resistor 334 to the base of transistor 336. However, the base of this transistor 326 is always positive and no further change occurs. Resistor 338 is used to antibias the transistor 336.

At the cessation of the negative read delay pulse, pin 7 returns to ground potential and, consequently, transistor 324 turns off. The collector of this transistor then rises to a negative voltage. This negative signal is coupled through capacitor 332 and resistor 334 to the base of transistor 336. Transistors 336 and 340 are part of a one shot multi-vibrator producing a pulse which is the exact duplicate of the read time pulse. The width of this pulse in a satisfactory application of the invention was in the order of 24 milliseconds. This pulse triggers the high speed scale conveyor action and is needed because a read pulse is not generated at the beginning and end of each loaf. This action insures two speed operation on every stack even when the unit is not making weight corrections. The two speed operation is essential to weighing because the slow speed operaation with the production contemplated will ordinarily not remove a stack from the scale before another stack drops. The slow speed, in other words, maintains proper stack formation and the higher speed removes the weight stack promptly in order that the following stack may be weighed.

Resistors 342 and 344 are collector loads for transistors 336 and 340, respectively. Diode 346 serves as a filter and prevents positive transients in the negative supply from triggering the one shot multi-vibrator. The timed duration of the one shot is determined by capacitor 348 and resistor 350. Resistor 352 and capacitor 354 comprise the feedback network for the one shot multi-vibrator. Resistors 356 and 358 are included in the circuitry as current limiting resistors.

The transistor 360 is controlled by the output of the one shot multi-vibrator or the read time pulse which appears at pin 3. This is provided in order that the scale conveyor 92 does not go into high speed operation until both the reject and control functions have taken a weight sample. The resistor 362 is used to antibias transistor 360, whereas resistor 364 functions as a collector load. Normally, transistor 360 is off and its collector rides negative. When transistor 360 turns on, the collector goes to ground potential. The output is routed through current limiting resistor 366 to pin 2 which is coupled with the reject card 320 to trigger the taking of a weight sample. The collector of transistor 360 also provides this positive going signal to coupling capacitor 368 and resistor 370 to the base of the transistor 372. However, the base of this transistor 372 is always positive and no further action occurs. Resistor 374 provides antibias for transistor 372.

Transistor 372, as well as transistor 376, are part of a one shot multi-vibrator which controls the time of high speed operation of the scale conveyor. It is triggered by the negative pulse generated when transistor 360 returns to its off condition. Resistors 378 and 380 are collector load resistors for transistors 372 and 376, respectively. The diode 382 prevents any positive transients in the negative supply from triggering the one shot multi-vibrator. The resistor 384 provides the necessary feedback path for the one shot multi-vibrator. Resistor 386 and capacitor 388 form the network which determines the time of the output pulse which, in the commercial application stated, is approximately 250 milliseconds.

A timing network comprising the resistor 390 and capacitor 392 serves to couple the output of this one shot multi-vibrator with transistor 394. Normally, the collector of transistor 376 is clamped to ground and the base of transistor 394 rides at a voltage determined by the voltage divider consisting of the external potentiometer 396 and resistor 398. When transistor 376 is turned off as a result of the firing of the one shot multi-vibrator, capacitor 392 is charged through the external potentiometer 396 and the series resistors 380 and 390. Therefore, the voltage on the base of the transistor 394 rises exponentially. This is desirable in that ultimately the same voltage shape is applied to the scale conveyor motor to control its speed. The motor speed will increase in a substantial exponential manner, thereby reducing jerk on the stacks of slices and thereby minimizing mechanical stresses and wear.

The motor is decelerated by a faster time constant determined by capacitor 392, resistor 390 and the external potentiometer 396. Since resistor 380 is not in the circuit when transistor 376 turns on, transistor 394 is used in an emitter follower configuration to prevent loading of the timing circuit. Resistor 398 is a collector load resistor whereas resistor 400 is an emitter load for bias stabilization of the next stage. The output voltage appears at pin 15 of this card 322 and is routed to the power amplifiers on the chassis and responsible for the negative voltage power supply therefor.

*Power supply*

The power supplies will now be discussed particularly in connection with the negative voltage supply for card 322. The output voltage that appears at pin 15 of this card is specifically routed to the power amplifiers in the form of transistors 404 and 406. The negative voltage power supply for these amplifiers consists of transformer 408, rectifiers 410 and 412, resistors 414 and 416 as well as capacitor 420. The positive voltage power supply, on the other hand, for these amplifiers consists of transformer 408, rectifier 422, resistors 424, 426 and 428, capacitor 430 and Zener diode 432. Resistor 434 and diode 436 are employed to provide a regulated negative voltage supply. Transistor 438, functioning as a switch, is used to apply or remove power from the power amplifiers 404 or 406 and this negative voltage supply to the motor speed control card 322. The output of this card 322 is applied to the base of the transistor 404 from pin 15 of this card.

Transistor 404 together with transistor 438 deliver this same negative voltage at a much lower impedance level to the motor. The capacitors 440 and 442 are used to suppress self-oscillations of the emitter followers. Resistors 444 and 446 are collector current limiting resistors, respectively, for transistors 438 and 404. Diode 448 clamps the antibias voltage to a nominal positive value. Diode 450, on the other hand, prevents the nominal voltage from turning on transistor 404. Transistor 452 is used to provide a break on the motor by acting as a short circuit when it is desired to stop the motor. When an output voltage to the motor exists, the base of transistors 438 and 452 are driven negative and transistor 452 is biased off. However, when this base drive diminishes, the motor coasts and performs as a generator. Transistor 452 is then turned on by the voltage generated and presents a short circuit to the generator. This action forces the motor to maintain speed dictated by the control voltage from the motor speed control card 322.

The remainder of the voltage supply is represented substantially in the disclosure of the above patent application SN 130,982. The addition and omission of any components are considered to be within the purview of one skilled in the art and readily obvious. For this reason, and for the sake of brevity, further discussion of the voltage supply is not considered necessary and will not be resorted to at the present time.

*Flow control motor driver*

This card 456 contains 2 channel amplifiers for driving the motor 137 which operates the flow control valve 84. The circuit of this card consists of two inputs, an output load and a single polarity voltage source supplying power to the load. As will be fully appreciated, if one of the inputs is energized while the other is not, current flows through the load in one direction. On the other hand, if the other input is energized with the former being inoperative, then current flows through the load in the opposite direction. If both inputs are energized simultaneously, no current flows through the load. In the printed circuit card 456, there are two identical channels, one having an input at terminal 2 and the other an input at terminal 15. The explanation and description for one channel accordingly equally applies to the other. For this reason, corresponding parts will be identified in the second channel with primes. As is noted in FIG. 14, only those equivalent component parts in the lower twin channel which are specifically referred to hereinafter have been denoted by a primed numeral.

Figure 14:
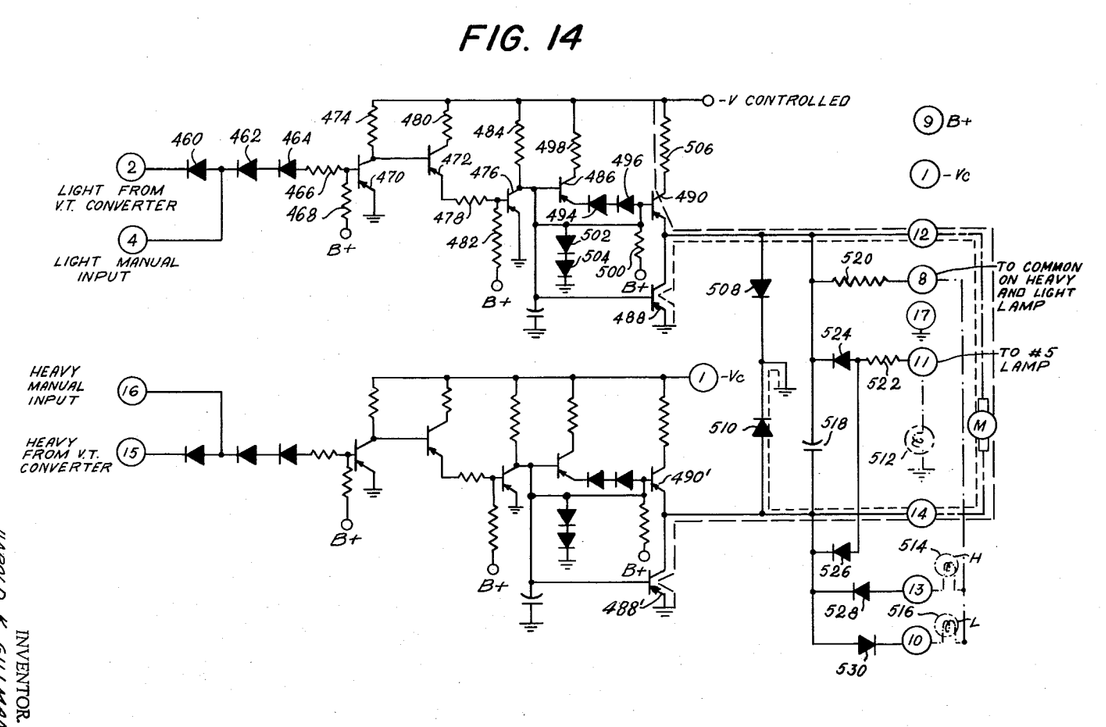
FIG. 14 is the printed circuit for regulating the operation of the servo-mechanism.

Diodes 460, 462 and 464 provide a blocking path so that low voltage levels inherent in the driver circuit that appear at pin 2 do not operate this channel. As is well known in the art, silicon diodes do not conduct in the forward direction until the voltage across the diode exceeds approximately 0.5 volt. Therefore, approximately 1.5 volts must exist at terminal 2 before the diodes will conduct. Resistor 466 provides current limiting and a high impedance to the negative voltage driving circuit. A resistor 468 is coupled with the base of transistor 470 and is used to anti-bias this transistor in the off condition. The transistor 470 is an inverter and is directly coupled to the emitter follower transistor 472. Resistor 474 is a collector load resistor for transistor 470, with current passing through this resistor to transistor 472 when transistor 470 is turned off. Transistor 472 supplies current to transistor 476 through the current limiting resistor 478. The resistor 480 is used to prevent a semi-conductor path between supply voltage and ground through transistors 472 and 470 ao prevent "thermal runaway." Resistor 482 provides antibias to transistor 476 to maintain it in the off condition bearing in mind that this transistor is another inverter stage operating at a higher power level. Resistor 484 serves as the collector load for this transistor.

The output of transistor 476 drives transistors 486 and 488 directly. When transistor 476 is biased off it antibiases transistor 488 and supplies a voltage to the base of transistor 486 thereby turning this transistor on. When transistor 476 is turned on, it biases transistor 486 off and clamps the base of transistor 488 to ground so that a negative voltage appears at the emitter of transistor 488 thereby holding this point near ground potential.

Transistor 486 is an emitter follower which drives transistor 490 through diodes 492 and 496 and presents a high inpedance to transistor 476. Resistor 498 is used to prevent a semi-conductor path between supply voltage and ground through transistors 486 and 476 to prevent "thermal runaway." Diodes 494 and 496 are used to prevent transistor 486 from conducting because of the antibias voltage supplied to the base of transistor 490 by resistor 500. Diodes 502 and 504 antibias the base of transistor 490 at a relatively low voltage which, in a particular application of this circuit, approximates +1.3 volts. Otherwise the tendency would be for transistor 486 to turn on if diodes 494 and 496 were not present. If this voltage was higher, transistor 486 would tend to conduct and, if this voltage was lower than transistor 490, would tend to dissipate power when the circuit dynamically breaks the motor. Resistor 508 is a current limiting resistor which also serves to interrupt the semiconductor path through transistors 490 and 488. Diodes 508 and 510 clamp the positive side of the motor to ground when it performs as a generator while it its coasting.

Pins 4 and 16 provide inputs for negative voltage from switches to manually control the motor, if desired.

If inputs pins 2 or 4 are supplied with a negative voltage, transistor 476 is turned off and its collector voltage rises negatively. The emitters of transistors 486 and 490 follow this voltage with small voltage drops across diodes 494 and 496. The negative voltage is applied to the motor through terminal 12 the other end of the motor returns through pin 14 to the emitter of transistor 488 prime to ground, and indicator lamps 512, 514 and 516. The heavy lamp 514 glows when pin 14 supplies a negative voltage and the light lamp 516 glows when pin 12 supplies a negative voltage. The lamp 512, connected to pin 11, glows when either the heavy or light lamp is energized. When the channel associated with input pin 15 is energized, the description above applies only when the action of the two is reversed.

Capacitor 518 is placed across the motor to suppress commutator arcing and noise. Resistors 520 and 522 are current limiting resistors whereas diodes 524, 526, 528 and 530 serve in filter capacity.

Thus, when a negative signal is applied to the pin 2 or 4 and not pin 15 or 16, transistor 490 supplies a negative voltage to pin 12. Negative current then flows through the motor from pin 12 to 14. The ground return for this current is through pin 14 into the emitter of transistor 488′ to the collector to ground. The motor is then turned in a direction to cause the flow control valve 84 to retard the flow of hydraulic fluid. Hence the feed cylinder travels at a slower speed and the slice thickness decreases. At the same time, negative current flows through diode 524 through resistor 522 to energize the lamp 512. At the same time, negative current flows through resistor 520, the light lamp 516, diode 530, transistor 488′, to ground, and this causes the light lamp 516 to glow.

When the input to pin 2 or 4 is removed, the motor coasts and performs as a generator in view of the absence of a negative voltage supply emanating from transistor 490. This generator action causes the lead associated with pin 12 to remain negative and the lead associated with pin 14 to swing positive. This negative voltage on pin 12 is clamped to ground by transistor 488 whereas the positive voltage is clamped to ground by diode 510. This action places a short circuit across the motor and brakes the motor to a quick stop, thereby assuring precise and accurate adjustment of the flow control valve 84.

When a negative signal is applied to pin 15 or 16, and in the absence of a negative signal at pin 2 or 4 transistor 490′ supplies a negative voltage to pin 14. Negative current will then flow through the motor from pin 14 to pin 12. The ground return for this current is through pin 12 into the emitter of transistor 488 to the collector end ultimately to ground. The motor, accordingly, turns in a direction to cause the flow control valve to increase the flow of hydraulic fluid in the hydraulic system of the slicing machine 34. The feeder 45 consequently travels at a faster rate and the slice thickness is correspondingly increased. Simultaneously, therewith, negative current flows through diode 526 through resistor 522 to light lamp 512. At the same time, negative current flows through diode 528, the heavy lamp 514, resistor 520, and transistor 488 to ground. This causes the heavy lamp 514 to glow.

When the input to pin 15 or 16 is removed, the motor coasts and performs as a generator because, at such time, a negative voltage is not supplied by transistor 490′. This generator action causes the lead associated with pin 14 to remain negative and the lead associated with pin 12 to swing positive. This negative voltage on pin 14 is clamped to ground by transistor 488′ with the positive voltage clamped to ground by diode 508. This action places a short circuit across the motor and breaks the motor to a quick stop in furtherance of the accurate adjustment of the flow control valve 84.

Operation

In summarizing the operation of the cold cut unit of the present invention, it will initially be recalled that several adjustments are made to produce a stack of sliced food product having a certain weight and slice number. To this end, the counting mechanism in the form of the selective gear transmission is set to one of the permissible speed ratios representing either 6, 8, or 10 slices. Upon completion of this adjustment, the stacker 32 will receive the selected number of slices on its projecting vanes. In passing, when the selected number of slices has been deposited upon these vanes by the slicing machine 34, the paddles will flip to deposit the accumulated stack of slices onto the weigh conveyor 92 and, simultaneously therewith, the paddles will present another pair of slice receiving vanes for supporting the following stack without cessation of operation of the feeder 45 of the slicing machine 34.

It may be necessary now to adjust the effective orifice opening of the flow control valve 84 for purposes of changing the rate of feed of the feeder 45 toward the slicing blade 56 and, consequently, the slice thickness depending upon the prior setting of the servo mechanism 85, the increase switch 72a or decrease switch 72b is actuated for purposes of energizing the motor 94 in the appropriate direction, thus changing the size of the orifice opening of the flow control valve 84.

The required batch weight is obtained by adjusting a weight change potentiometer which electrically shifts the null point of the scale system.

Instead of employing a potentiometer, a standard resistor may be utilized to fixedly determine the read time control which permits the reading of a stack weight on the weigh conveyor 92 at a predetermined time following the initial impact of the stack thereon. The time is selected such that the registry of the weight of stack by scale 98 takes place while the stack is still on the surfaces of the weight conveyor 92, prior to the landing of the next succeeding stack and following the removal of the next preceding weighed stack therefrom.

Heavy and light percentage correction potentiometers are set to determine the magnitude of the correction to be fed back to the servo mechanism 85 for adjusting the speed or rate of advance of the feeder 45, this being in terms of a percentage of the actual error.

Low and high reject potentiometers are adjusted for purposes of establishing the permissible upper and lower limit of weight for stacks of sliced product that will not be rejected by the reject mechanism 42. The low reject potentiometer will be set to prevent any underweights from passing through the reject mechanism, whereas the high reject potentiometer will normally be set to provide for a one quarter ounce tolerance before the reject solenoid 288 is actuated.

The loaf 54 of food product to be sliced is placed on the bed (not shown) of the slicing machine 34 such that it is firmly engaged by the machine's gripping means. A switch 74 is turned on and the handle 68 next to lever 73 is depressed to start the forward advance of the feeder 45 and, consequently, the loaf 54 of the product to be sliced towards the slicing blade 56. The leading end of the loaf 54 actuates a limit switch immediately before the slicing blade 56 to enable the first stack counter 316 to disable the read pulse generator by turning off the inhibit circuit until one, two or three stacks are detected by the scale 98, depending upon the adjustment. The counter is reset by a limit switch as the feeder 45 reaches the end of its travel which also has the effect of preventing this scale from registering the last two or selected number of stacks of each loaf.

The stack of slices following the first, second or third, as the case may be, will be deposited on the weigh conveyor 92 by the stacker 32 and registered by the scale 98. Upon expiration of the read time delay and assuming no other inhibit signals are transmitted to the inhibitor circuitry, the read pulse generator is triggered. A constant pulse is then sent to the voltage-to-time converter 318 where it is compared with the reference voltage. The extent of error is converted to a time pulse and appropriately channeled to the flow control motor drive 456 in accordance with the direction of error.

If the stack weight registered is outside the prescribed weight range, the servo mechanism 85 is energized to change the size of the orifice opening of the flow control valve 84. Consequently, the rate of advance of the feeder or pusher 55 towards the slicing blade 56 will be correspondingly changed.

Upon expiration of the read time delay, the scale output is supplied to the reject circuitry 320. The voltage signal is there compared with a reference voltage. If the scale output falls between the levels at which the circuitry is set to respond, an accept delay circuit is triggered which, in turn, actuates the accept timer and, upon the expiration of this time, eventually the reject solenoid 288. Thus, the stack of sliced product having a weight within the prescribed tolerance is permitted uninterrupted passage to the packaging conveyor 40. On the other hand, if the scale output is not within the limits preset, the solenoid 288 will be de-energized and the incorrect stack will be pushed aside on the conveyor 42 so that the proper weight can be made.

The slicing operation will then continue normally and the above cycle repeated until the loaf 54 has been consumed.

In accordance with the present invention, production speeds up to 120 packages per minute of stacked product may be realized. At no time will an underweight stack of slices be permitted to reach the packaging station. In addition, giveaway is maintained and controlled from substantially zero to one quarter of an ounce, with a net average giveaway being in the neighborhood of one eighth of an ounce per package and even less. Optimum production is possible with a minimum labor cost. To this end, the unit will slice, stack and weigh while conveying and the accuracy of weights maintained automatically. Labor and space requirements are minimized for a given volume of production. Excessive labor costs involved in manually checkweighing every stack or unit is eliminated.

The two speed operation of the weigh conveyor minimizes the tendency of stacks to shingle when dropped by the stacker. In providing reduced weigh conveyor speed when a stack is deposited thereon, the stack is not jerked forwardly as would be the case if the conveyor were traveling at high speeds. Thus, scale vibration which may cause weight errors is significantly reduced.

The servo mechanism for the flow control of the present invention reduces the number of components for the purposes desired and, consequently, reduces the likelihood of component failure. The wearing of components which in themselves contribute to the accuracy of flow control adjustment is minimized, if not entirely eliminated.

Thus, the several aforenoted objects and advantages, among others, are most effectively attained. It should be understood, however, that this invention is in no sense limited by the single and somewhat preferred embodiment of the invention disclosed herein but is to be determined by the scope of the appended claims.

I claim:

1. In combination a slicing machine having a slicing blade, a feeding means for feeding of product to be sliced into said blade, and control means for determining the rate of advance of said feeding means towards said blade, and, consequently, the slice thickness; apparatus for stacking a preselected number of slices of said product as they are discharged by said slicing machine and then transferring the stacks of sliced product, said apparatus comprising in combination a stacking means to be located adjacent the discharge end of said slicing machine for receiving the slices discharged therefrom; slice counting means for determining the preselected number of slices discharged from the slicing machine; stacker actuation means coupled with both said stacking means and said slice counting means for actuating said stacking means to transfer the stack of preselected number of slices of said product and ready said stacking means for reception of another stack of slices; stack receiving means and conveying means in stack receiving position adjacent said stacking means, and adapted to receive thereon the stacks of sliced product transferred by said stacking means; weighing means operatively connected with said receiving and conveying means such that it is adapted to register the weight of the individual stacks thereon; said stacking means and said receiving and conveying means being so constructed and arranged such that said stacking means transfers the stacks of sliced product to said receiving and conveying means at a location substantially near said weighing means servo mechanism adapted to be coupled with said control means of said slicing machine and adapted to be actuated to thereby correct the adjustment of said control means of said slicing machine to adjust the rate of advance of said feeding means and, consequently the slice thickness; feed back means operatively connected with said weighing means and said servo mechanism for feeding back signals to such servo mechanism corresponding to the weight of the individual stacks over and below said prescribed weight for the preselected number of slices to thereby automatically actuate said servo mechanism to correct the adjustment of said control means of said slicing machine to, respectively, decrease and increase the rate of advance of said feeding means and, consequently, decrease and increase the slice thickness; said servo mechanism including a reversible motor adapted to be actuated in one direction upon the receipt of signals from said feed back means to adjust said control means and decrease the rate of advance of said feeding means and be actuated in the other direction by said feed back means to adjust said control means to increase the rate of advance of said feeding means; said servo mechanism includes means for braking said motor for accurate adjustment of said flow control means; said weighing means, said knife and said servo mechanism being disposed at a minimum distance from one another to minimize the distance between the place at which the weight is registered and the place at which the adjustment of slice thickness takes place and, consequently, reduce the time required for such adjustment to become effective so that a minimum period of time elapses following the registration of a stack outside the prescribed weight and the correction of the adjustment of said control means of said slicing machine by said servo mechanism; reject means for rejecting stacks of sliced product that are underweight; and electrical means electrically coupling said reject means with said weighing means to cause said reject means to be actuated to reject a stack of sliced product following registration of underweight of this stack by said weighing means.

2. The invention in accordance with claim 1 wherein said feedback means transmits signals to said servo mechanism in preset increments and of a duration corresponding to the registered magnitude of the weight over and above the prescribed weight to correspondingly correct the adjustment of the control means in preset increments of the magnitude of the registered weight over and above the prescribed weight.

3. The invention in accordance with claim 1 wherein delay means is included to delay the operation of the weighing means until after a predetermined time interval following the initial impact of a stack on the receiving and conveying means.

4. The invention in accordance with claim 1 wherein printed card circuits are employed in the feedback means.

5. The invention in accordance with claim 1 wherein said conveyor comprises a drive roll and a driven roll, an endless belt mounted on said rolls for receiving and transferring the stacks deposited by said stacker, and a two speed motor co-axially mounted with said drive roll and being substantially encased by said drive roll.

6. In combination a slicing machine having a slicing blade, a feeding means for feeding of product to be sliced into said blade, and control means for determining the rate of advance of said feeding means towards said blade and, consequently, the slice thickness; apparatus for stacking a preselected number of slices of said product as they are discharged by said slicing machine and then transferring the stacks of sliced product, said apparatus comprising in combination a stacking means to be located adjacent the discharge end of said slicing machine for receiving the slices discharged therefrom; slice counting means for determining the preselected number of slices discharged from the slicing machine; stacker actuation means coupled with both said stacking means and said slice counting means for actuating said stacking means to transfer the stack of preselected number of slices of said products and ready said stacking means for reception of another stack of slices; stack receiving and conveying means in stack receiving position adjacent said stacking means, and adapted to receive thereon the stacks of sliced product transferred by said stacking means; weighing means operatively connected with said receiving and conveying means such that it is adapted to register the weight of the individual stacks thereon; said stacking means and said receiving and conveying means being so constructed and arranged such that said stacking means transfers the stacks of sliced product to said receiving and conveying means at a location substantially near said weighing means; servo mechanism adapted to be coupled with said control means of said slicing machine and adapted to be actuated to thereby correct the adjustment of said control means of said slicing machine to adjust the rate of advance of said feeding means and, consequently, the slice thickness; feed back means operatively connected with said weighing means and said servo mechanism for feeding back signals to such servo mechanism corresponding to the weight of the individual stacks over and below said prescribed weight for the preselected number of slices to thereby automatically actuate said servo mechanism to correct the adjustment of said control means of said slicing machine to, respectively, decrease and increase the rate of advance of said feeding means, and, consequently, decrease and increase the slice thickness; said weighing means, said knife and said servo mechanism being disposed at a minimum distance from one another to minimize the distance between the place at which the weight is registered and the place at which the adjustment of slice thickness takes place and, consequently, reduce the time required for such adjustment to become effective so that a minimum period of time elapses following the registration of a stack outside the prescribed weight and the correction of the adjustment of said control means of said slicing machine by said servo mechanism; reject means for rejecting stacks of sliced product that are underweight; said counting means actuates said reject means for automatically rejecting a preset number of stacks first sliced from the product to be sliced and electrical means electrically coupling said reject means with said weighing means to cause said reject means to be actuated to reject a stack of sliced product following the registration of underweight of this stack by said weighing means; shiftable means for carrying the weighed stacks and said reject means, when actuated, adapted to actuate said shiftable means for rejecting those stacks of other than the prescribed weight.

7. The invention in accordance with claim 6 wherein transfer means including said shiftable means are adjacent the receiving and conveying means for carrying away the stacks of sliced product, said reject means are on said transfer means, said transfer means including a constantly driven conveyor comprised of a series of spaced parallel rods and plaques slidably mounted by said rods, several of which plaques are adapted to receive and support thereon a stack of slices coming from said receiving and conveying means and transfer such stacks of prescribed weight, and said reject means including shifting means for shifting the several plaques when the stacks supported thereon are not within the prescribed weight limits.

8. The invention in accordance with claim 7 wherein said shifting means includes a solenoid, control means are operatively connected between said solenoid and said receiving and conveying means for actuating said solenoid when a stack of slices is registered by said receiving and conveying means within the prescribed weight limits and when said stack of slices is outside of the prescribed weight to cause operation of said shifting means to shift the several plaques carrying such stack in order that such stack is readily discernable from the stacks of prescribed weight.

9. The invention in accordance with claim 6 wherein a delay means is included to delay the actuation of the reject means until the expiration of a predetermined period of time following the registration of weight by the weighing means.

10. The invention in accordance with claim 6 wherein printed card circuits are employed in constituting the electrical controlling connection between the weighing means and the reject means.

References Cited by the Examiner

UNITED STATES PATENTS

| | | | |
|---|---|---|---|
| 2,812,792 | 11/57 | Allbright | 146—94 X |
| 2,938,626 | 5/60 | Dahms | 209—121 |
| 2,980,231 | 4/61 | Mahaffy et al. | 209—121 XR |
| 2,989,104 | 6/61 | Good | 146—94 |
| 3,009,572 | 11/61 | Seaborn | 209—121 |
| 3,010,499 | 11/61 | Dahms et al. | 146—94 |
| 3,027,924 | 4/62 | Gillman | 146—94 |
| 3,093,245 | 6/63 | Worcester et al. | 209—121 |
| 3,099,304 | 7/63 | Monsees et al. | 146—94 |

J. SPENCER OVERHOLSER, *Primary Examiner.*